(12) United States Patent
Englund et al.

(10) Patent No.: US 9,709,440 B2
(45) Date of Patent: Jul. 18, 2017

(54) METHODS AND APPARATUS FOR SPECTROMETRY USING MULTIMODE INTERFERENCE IN A TAPERED SPIRAL-SHAPED WAVEGUIDE

(71) Applicant: MASSACHUSETTS INSTITUTE OF TECHNOLOGY, Cambridge, MA (US)

(72) Inventors: Dirk Robert Englund, Cambridge, MA (US); Edward H. Chen, Cambridge, MA (US); Fan Meng, Cambridge, MA (US); Tim Schroder, Cambridge, MA (US); Noel Heng Loon Wang, New York, NY (US); Ren-Jye Shiue, Cambridge, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 179 days.

(21) Appl. No.: 14/325,502

(22) Filed: Jul. 8, 2014

(65) Prior Publication Data

US 2015/0168217 A1 Jun. 18, 2015

Related U.S. Application Data

(60) Provisional application No. 61/926,467, filed on Jan. 13, 2014, provisional application No. 61/917,459, filed on Dec. 18, 2013.

(51) Int. Cl.
*G01J 3/02* (2006.01)
*G01J 3/453* (2006.01)
(Continued)

(52) U.S. Cl.
CPC ............ *G01J 3/0205* (2013.01); *G01J 3/0218* (2013.01); *G01J 3/0256* (2013.01); *G01J 3/453* (2013.01);
(Continued)

(58) Field of Classification Search
CPC ........ G01J 3/0205; G01J 3/0218; G01J 3/453; G01J 3/0256; G02B 6/4287; G02B 6/29344
See application file for complete search history.

(56) References Cited

U.S. PATENT DOCUMENTS

2005/0226579 A1 10/2005 Fink et al.
2006/0278240 A1 12/2006 Spillman, Jr. et al.
(Continued)

FOREIGN PATENT DOCUMENTS

| WO | WO 2011/004378 A1 | 1/2011 |
| WO | WO 2011/137316 A2 | 11/2011 |
| WO | WO 2013/188520 A2 | 12/2013 |

OTHER PUBLICATIONS

N. Ponnampalam, R. G. DeCorby, "Self-assembled hollow waveguides with hybrid metaldielectric Bragg claddings," Opt. Express 15, 12595-12604. 2007.*

(Continued)

*Primary Examiner* — Hwa Lee
(74) *Attorney, Agent, or Firm* — Cooley LLP

(57) ABSTRACT

Multimode interference can be used to achieve ultra-high resolving powers (e.g., $Q>10^5$) with linewidths down to 10 pm at 1500 nm and a broad spectroscopy range (e.g., 400-2400 nm) within a monolithic, millimeter-scale device. For instance, multimode interference (MMI) in a tapered waveguide enables fine resolution and broadband spectroscopy in a compact, monolithic device. The operating range is limited by the transparency of the waveguide material and (Continued)

the sensitivity of the camera; thus, the technique can be easily extended into the ultraviolet and mid- and deep-infrared spectrum. Experiments show that a tapered fiber multimode interference spectrometer can operate across a range from 500 nm to 1600 nm (B=1.0576) without moving parts. The technique is suitable for on-chip tapered multimode waveguides, which could be fabricated in high volume by printing or optical lithography, for applications from biochemical sensing to the life and physical sciences.

8 Claims, 17 Drawing Sheets

(51) Int. Cl.
G02B 6/42        (2006.01)
G02B 6/293       (2006.01)
(52) U.S. Cl.
CPC ........ G02B 6/29344 (2013.01); G02B 6/4287 (2013.01)

(56) References Cited

U.S. PATENT DOCUMENTS

| 2007/0279636 | A1 | 12/2007 | Li et al. |
| 2008/0123106 | A1 | 5/2008 | Zeng et al. |
| 2008/0262359 | A1 | 10/2008 | Tearney et al. |
| 2009/0177094 | A1 | 7/2009 | Brown et al. |
| 2010/0202734 | A1 | 8/2010 | Decorby |
| 2011/0149296 | A1 | 6/2011 | Tearney et al. |
| 2012/0081704 | A1 | 4/2012 | Morrow et al. |
| 2012/0147362 | A1 | 6/2012 | Crowther et al. |
| 2012/0176600 | A1 | 7/2012 | Falk et al. |
| 2012/0200854 | A1 | 8/2012 | Bland-Hawthorn |

OTHER PUBLICATIONS

Birks, T. A. et al., "The Shape of Fiber Tapers", Journal of Lightwave Technology, vol. 10, No. 4, (1992), p. 432-438.
Brambilla, G. et al., "Ultra-low-loss optical fiber nanotapers", Optics Express, vol. 12, No. 10, (2004), pp. 2258-2263.
Chan, J. W. et al., "Raman Spectroscopic Analysis of Biochemical Changes in Individual Triglyceride-Rich Lipoproteins in the Pre- and Postprandial State", Analytical Chemistry, vol. 77, No. 18, (2005), pp. 5870-5876.
Cheben, P. et al., "A high-resolution silicon-on-insulator arrayed waveguide grating microspectrometer with sub-micrometer aperture waveguides", Optics Express, vol. 15, No. 5, (2007), pp. 2299-2306.
Decorby, R. G. et al., "Chip-scale spectrometry based on tapered hollow Bragg waveguides", Optics Express, vol. 17, No. 19, (2009), pp. 16632-16645.
Fiddler, M. N. et al., "Laser spectroscopy for atmospheric and environmental sensing", Sensors, vol. 9, (2009), pp. 10447-10512.
Freude, W., et al., "Speckle Interferometry for Spectral Analysis of Laser Sources and Multimode Optical Waveguides", Journal of Lightwave Technology, vol. LT-4, No. 1, (1986), pp. 64-72.
Gan, X. et al., "A high-resolution spectrometer based on a compact planar two dimensional photonic crystal cavity array", Applied Physics Letter, vol. 100, (2012), pp. 231104-1-231104-4.
Grabarnik, S. et al., "Planar double-grating microspectrometer", Optics Express, vol. 15, (2007), pp. 3581-3588.
Hang, Q. et al., "Photonic bandgap fiber bundle spectrometer", Applied Optics, vol. 49, (2010), pp. 4791-4806.
Hlubina, P., "Spectral and Dispersion Analysis of Laser Sources and Multimode Fibers via the Statistics of the Intensity Pattern", Journal of Modern Optics, vol. 41, Issue 5, pp. 1001-1014 and Abstract, (May 1994).
Kyotoku, B. C. et al., "Sub-nm resolution cavity enhanced microspectrometer", Optics Express, vol. 18, No. 1, (2010), pp. 102-107.
Laubscher, M et al., "Spectroscopic optical coherence tomography based on wavelength de-multiplexing and smart pixel array detection", Optics Communications, vol. 237, (2004), pp. 275-283.
Lobiński, R., et al., "Mass spectrometry in bioinorganic analytical chemistry", Mass Spectrometry Reviews, vol. 25, (2006), pp. 255-289.
Matsumoto, T. et al., "Wavelength demultiplexer consisting of Photonic crystal superprism and superlens", Optics Express, vol. 13, No. 26, (2005), pp. 10768-10776.
Momeni, B. et al., "Planar photonic crystal microspectrometers in silicon-nitride for the visible range", Optics Express, vol. 17, No. 19, (2009), pp. 17060-17069.
Mudanyali, O. et al., "Integrated Rapid-Diagnostic-Test Reader Platform on a Cellphone", Lab Chip, vol. 12, (2012), pp. 2678-2686.
Nitkowski, A. et al., "Cavity-enhanced on-chip absorption spectroscopy using microring resonators", Optics Express, vol. 16, No. 16, (2008), pp. 11930-11936.
Pervez, N. et al., "Photonic crystal spectrometer", Optics Express, vol. 18, (2010), pp. 8277-8285.
Redding, B. et al., "Noise analysis of spectrometers based on speckle pattern reconstruction", Applied Optics, vol. 53, No. 3, (2014), pp. 410-417.
Redding, B. et al., "Compact spectrometer based on disordered photonic chip", Nature Photonics, vol. 7, (Jul. 28, 2013), pp. 746-751.
Redding, B. et al., "All-fiber spectrometer based on speckle pattern reconstruction," Optics Express, vol. 21, No. 5, (Mar. 8, 2013), pp. 6584-6600.
Redding, B. et al., "Using a multimode fiber as a high-resolution, low-loss spectrometer", Optics Letters, vol. 37, No. 16, (2012), pp. 3384-3386.
Schweiger, G. et al., "Microresonator array for high-resolution spectroscopy", Optics Letters, vol. 32, No. 18, (2007), pp. 2644-2646.
Velasco, A. et al., "High-resolution Fourier-transform spectrometer chip with microphotonic silicon spiral waveguides", Optics Letters, vol. 38, No. 5, (Feb. 25, 2013), pp. 706-708.
Xia, Z. et al., "High resolution on-chip spectroscopy based on miniaturized microdonut resonators", Optics Express, vol. 19, No. 13, (2011), pp. 12356-12364.
Xu, Z et al., "Multimodal multiplex spectroscopy using photonic crystals", Optics Express, vol. 11, No. 18, (2003), pp. 2126-2133.
Notification of Transmittal of the International Search Report and the Written Opinion of the International Searching Authority, or the Declaration in related PCT Application No. PCT/US2014/045791, filed Jul. 8, 2014, 13 pages.

* cited by examiner

METHODS AND APPARATUS FOR SPECTROMETRY USING MULTIMODE INTERFERENCE IN A TAPERED SPIRAL-SHAPED WAVEGUIDE

CROSS REFERENCE TO RELATED APPLICATIONS

This application claims the priority benefit under 35 U.S.C. §119(e) of U.S. Application No. 61/926,467, filed on Jan. 13, 2014, and entitled "Broadband and Ultrahigh Resolution Spectrometer Based on a Multimode Waveguide," and of U.S. Application No. 61/917,459, filed on Dec. 18, 2013, and also entitled "Broadband and Ultrahigh Resolution Spectrometer Based on a Multimode Waveguide." Each of the above-referenced applications is incorporated herein by reference in its entirety.

GOVERNMENT SPONSORSHIP

This invention was made with government support under Grant No. IIP1152707 awarded by the National Science Foundation and under Contract No. W31P4Q-13-C-0040 awarded by the U.S. Army. The government has certain rights in this invention.

BACKGROUND

In the beginning of the 19th century, William Wollaston and Joseph Fraunhofer developed the basics of modern spectral analysis of light by measuring the sun's electromagnetic radiation spectrum for the first time. Since then, spectroscopy has become an essential tool for scientific research, including analytical chemistry, biochemical sensing, material analysis, optical communication, and medical applications. In a typical commercial spectrometer, a dispersive prism or a grating projects spectral components of light onto a detector array. Since the optical path length limits the spectral resolution, high-performance grating spectrometers are inevitably bulky and expensive.

In recent years, there has been a strong effort to develop compact and monolithic spectrometers. In addition to miniature grating spectrometers, resonant structures such as nanocavities, have been employed to separate spectral components into unique detectors. This research has produced millimeter-scale spectrometers with high resolving powers of $Q>10^4$, as quantified by the quality factor $Q=\omega_0/\delta\omega$, where $\delta\omega$ is the spectral resolution at frequency $\omega_0$. Another class of spectrometers relies on imaging the speckle patterns of a photonic bandgap fiber bundle or a multimode optical fiber. However, these spectrometers are centimeters to meters long, and the long length makes them susceptible to environmental fluctuations. A recently demonstrated silicon-based spectrometer measures the multimode transmission profile from a disordered photonic crystal structure to achieve a Q comparable to typical grating spectrometers, but requires careful coupling to a sub-wavelength input waveguide and has a limited bandwidth from 1500 nm to 1525 nm. A high-resolution Fourier Transform spectrometer has also been demonstrated on-chip, but its narrow free spectral range limits its operation bandwidth to 0.75 nm at 1550 nm.

SUMMARY

Embodiments of the present invention include spectrometers and methods of sensing spectral information. In one example, an inventive spectrometer comprises a multimode waveguide, a detector array, and a processor. In operation, the multimode waveguide guides at least two spatial modes of an electromagnetic beam along a propagation axis to at least one dispersive region with an intermodal dispersion that varies as a function of position along the propagation axis. The detector array, which is in optical communication with the dispersive region, images an interference pattern produced by at least a portion of the spatial modes of the electromagnetic beam. And the processor, which is operably coupled to the detector array, determines a spectrum of the electromagnetic beam based at least in part on the interference pattern sensed by the detector array.

In some cases, the multimode waveguide comprises a multimode optical fiber and the dispersive region comprises a tapered and/or spiral-shaped portion of the multimode optical fiber. The multimode waveguide may also comprise at least one layer of dielectric material with a first refractive index disposed on a substrate having a second refractive index that is lower than the first refractive index. In these cases, the detector array may comprises a plurality of detector elements disposed in a plane substantially parallel to the layer(s) of dielectric material.

The dispersive region may comprises a plurality of nanoparticles. It may also have a length of about 0.5 millimeter to 1.5 millimeter. And it can have a numerical aperture of about 0.22 to about 0.80.

The spectrometer may also include a memory, operably coupled to the processor, that stores calibration data. This calibration data may represent a mapping of interference patterns of spatial modes supported by the multimode waveguide to possible spectral components of the electromagnetic beam. In operation, the processor may use this mapping in determining the spectrum of the electromagnetic beam. For instance, the processor may estimate the spectrum by computing a pseudo-inverse matrix $\Lambda^+$ given by a singular decomposition of a matrix $\Lambda$ to obtain a least-squares solution of $\vec{s}=\Lambda^+\vec{\Psi}$, where $\vec{s}$ is an amplitude vector representing the spectrum and $\vec{\Psi}$ is a vector representing the interference pattern.

Depending on the application, the spectrometer can operate over a wavelength range of about 400 nanometers to about 2400 nanometers. It can also operate with a resolution of about 10 picometers to about 1 nanometer. Its resolving power Q may be about 15,950 to about 155,000, and its fractional bandwidth may be at least about 1.00.

Another embodiment includes an optical spectrum analyzer with a substrate, a multimode waveguide disposed on the substrate, a detector array, a processor, and a memory. The substrate has a first refractive index, and the multimode waveguide has a second refractive index greater than the first refractive index. The multimode waveguide also defining at least one dispersive region with a non-uniform intermodal dispersion and an area of less than about 100 square millimeters. In operation, the dispersive region disperses a plurality of spatial modes of an optical beam propagating via the multimode waveguide towards the detector array, which senses an interference pattern formed by energy radiated by the dispersive region. The memory stores a mapping of possible interference patterns to possible spectra of optical beams supported by the multimode waveguide. And the processor, which is operably coupled to the detector array and the memory, determine a spectrum of the optical beam based at least in part on the interference pattern and on the mapping. The processor may determine the spectrum with a resolving power of about 15,950 to about 155,000 and a fractional bandwidth of at least about 1.0.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1A:
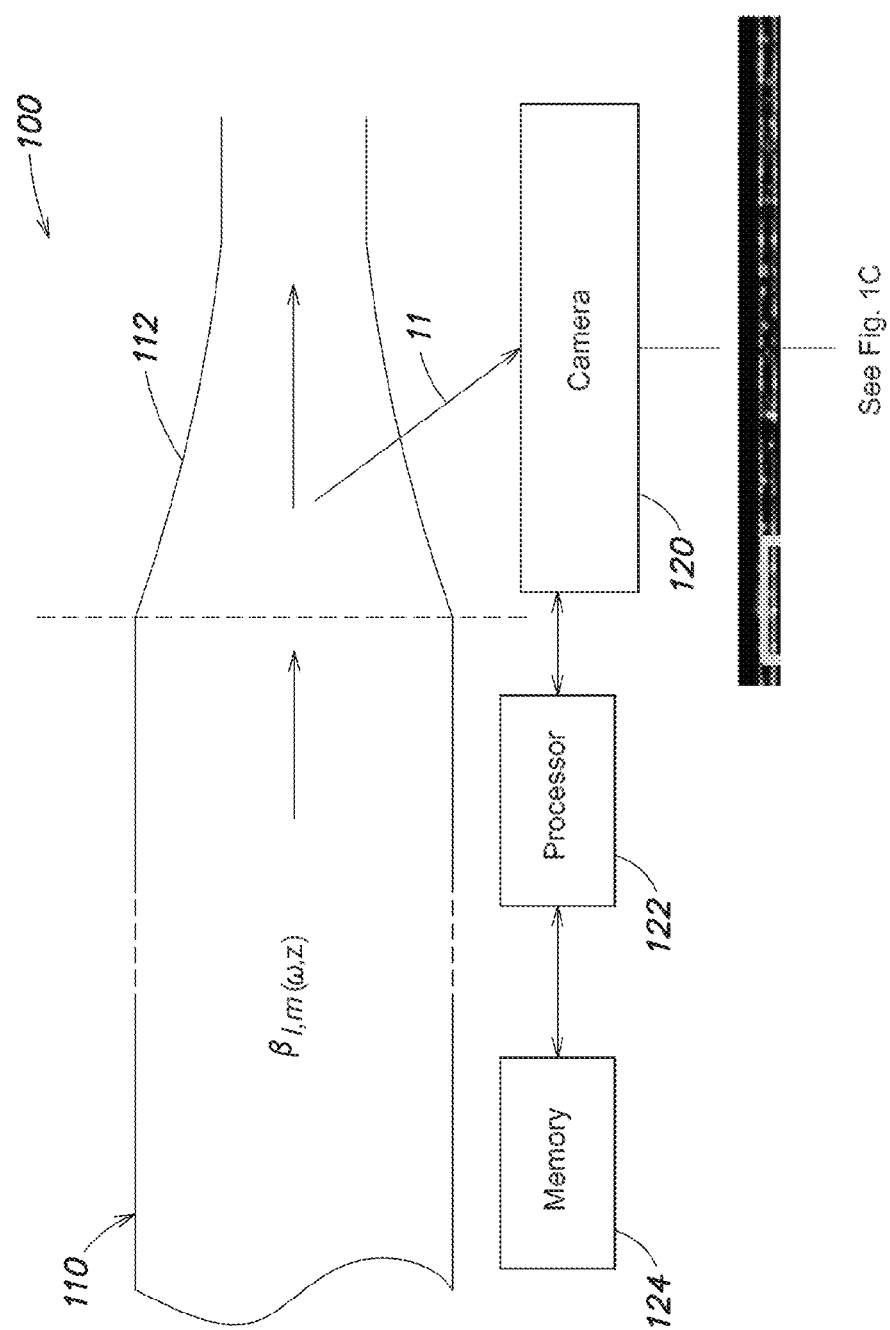
FIG. 1A shows an elevation cross section of a tapered fiber multimode interference (TFMMI) spectrometer.

Optical spectroscopy is a fundamental tool in numerous areas of science and technology. Much effort has focused on miniaturizing spectrometers, but so far, this required sacrificing the high spectral resolution and broad operating range possible in large grating spectrometers. Here, we describe a spectroscopy technique that does not make this trade-off, matching the performance of grating spectrometers using modal interference in a multimode waveguide with an area of a few square millimeters or less. Examples of these multimode interference spectrometers can acquire broadband spectra in a single camera exposure with a resolution of 40 pm in the visible spectrum and 10 pm in the infrared spectrum (corresponding to quality factors of $10^4$–$10^5$). In addition, exemplary multimode interference spectrometers can perform spectroscopy from 500 nm to 1600 nm (corresponding to a fractional bandwidth of 1.0576). In some cases, an exemplary multimode interference spectrometer can operate across the entire transparency window of silica (e.g., about 400 nm to about 2400 nm) or other materials. Multimode interference spectroscopy of leaky modes can be realized in a variety of devices, including tapered multimode optical fibers and printed waveguides of various transparent materials. These kinds of MMI spectrometers could be used in applications requiring broadband operation and high-resolution spectroscopic analysis.

A monolithic, compact spectrometer based on multimode interference (MMI) can simultaneously achieve high resolving power and bandwidth in a simple-to-couple and compact device. In a multimode waveguide, such as a multimode optical fiber, light at a frequency ω propagates in multiple spatial modes, which typically have different propagation constants. These spatial modes interfere to produce a wavelength-dependent interference profile that can be regarded as a "fingerprint," or a basis state, of the input light's frequency state. If the wavelength dependence of the interference profiles associated with the multimode waveguide is known, e.g., because it has been determined through calibration, simulation, or design, then it can be used to determine the spectrum of the light propagating into the multimode waveguide.

As understood by those of skill in the art, a multimode waveguide may exhibit intermodal dispersion. In other words, different spatial modes propagate through the multimode waveguide at different speeds. Intermodal dispersion causes the spatial interference pattern formed by the spatial modes to vary periodically as a function of the multimode waveguide length. For a spectrometer composed of a multimode waveguide whose intermodal dispersion remains constant as a function of length, the spectral resolution depends on the spectral correlation width of the speckle, which scales inversely with the length of the fiber (up to a particular beat length). Thus, the longer the propagation distances through the multimode waveguide, the finer the spectral resolution.

But in a multimode waveguide whose intermodal dispersion varies as a function of length (e.g., due to spatial inhomogeneity of the refractive index), the spectral correlation width (and hence the spectral resolution) does not necessarily vary with propagation length. As a result, a multimode waveguide with a spatially varying intermodal dispersion can provide fine spectral resolution over relatively short propagation distances. Moreover, tailoring the intermodal dispersion profile of the multimode waveguide (e.g., by appropriately tapering the waveguide) can provide a desired spectral resolution.

Although some recently developed compact spectrometers can match the spectral resolution of grating spectrometers, these other compact spectrometers do not offer both high resolving power and fractional bandwidth within a compact device. Miniature grating spectrometers have fractional bandwidths, $B=(\omega_{max}-\omega_{min})/[\omega_{max}+\omega_{min})/2]$, exceeding $10^{-1}$, but have resolving powers, $Q=\omega/\delta\omega$, lower than that of a commercial grating spectrometer (e.g., an Acton SP2500 spectrometer). In contrast, an exemplary multimode interference spectrometer has resolving powers of $Q>10^4$ and $Q>10^5$ in the visible spectrum and the near-infrared spectrum, respectively, and a fractional bandwidth $B\approx 1$.

Tapered Fiber Multimode Interference Spectrometer

FIGS. 1A-1D illustrate a tapered fiber multimode interference (TFMMI) spectrometer 100. As shown in FIG. 1A, the TFMMI spectrometer 100 includes a multimode optical fiber 110 that is tapered to form a dispersive region 112 whose modal dispersion varies as a function of position along the fiber's longitudinal axis (coincident with the propagation axis). The dispersive region 112 can be formed by tapering a standard multimode optical fiber (e.g., Thorlabs AFS105/125y) using the well-known flame-brush technique with a taper length of about 0.5 mm to about 5 mm (e.g., 1.0 mm, 1.5 mm, 2.0 mm, 2.5 mm, and so on). This taper may have a numerical aperture of about 0.22 to about 0.80 (e.g., about 0.40). The TFMMI spectrometer 100 also includes a sensor array (camera) 120 aligned with the dispersive region 112, and a processor 122 and memory 124 that are operably coupled to the sensor array 120 and to each other. In some cases, the TFMMI spectrometer 100 may include a polarization controller (not shown) to control the polarization of the input and/or one or more optical elements (e.g., lenses, prisms, etc.) to image at least portion (e.g., about 1.5 mm) of the dispersive region 112 onto the sensor array 110.

In general, the number of elements in the sensor array should be greater than the dispersive region's resolving power to prevent the sensor array's resolution from limiting the TFMMI spectrometer's resolving power. Nevertheless, even inexpensive sensor arrays can produce high-quality measurements. For example, the TFMMI spectrometer 100 may includes a smartphone imager array (e.g., from a Samsung Galaxy S4) with a 0.3 megapixel setting and under 200× magnification to detect visible and/or infrared light. Even with JPEG compression affecting individual pixel information, the image resolution is good enough to determine the signal spectrum with subnanometer-resolution. Furthermore, by utilizing more pixels in the imager array and by controlling the imager array directly, all pixel information can be recorded.

TABLE 1

Figures of merits for different spectrometers, including an exemplary tapered fiber multimode interference spectrometer (last row).

| Spectrometer | Demonstrated spectral range (nm) | Spectral resolution | Resolving power, $Q=\frac{\omega}{\delta\omega}$ | Fractional bandwidth, $B=\frac{\omega_{max}-\omega_{min}}{(\omega_{max}+\omega_{min})/2}$ | Footprint |
|---|---|---|---|---|---|
| Commercial grating (Acton 2500) | 555-720 (per grating) | 0.26 nm @ 638 nm | 2,455 | 0.259 | 534 mm × 280 mm × 203 mm; 18 kg |
| Miniature grating | 450-750 | 3 nm @ 600 nm | 200 | 0.500 | 3 mm × 3 mm × 11 mm |
| Nanocavities array | 805-850 | 0.3 nm @ 840 nm | 2,800 | 0.0544 | 50 µm × 50 µm |
| Disordered photonic chip | 1500-1525 | 0.75 nm @ 1500 nm | 2,000 | 0.0163 | 25 µm × 50 µm |
| On-chip Fourier Transform | 1550.375-1549.625 | 40 pm @ 1550 nm | 38,750 | 4.838 × 10⁻⁴ | 12 mm² |
| Arrayed-waveguide grating | 1539-1549 | 0.15 nm @ 1545 nm | 10,300 | 0.00648 | 8 mm × 8 mm |
| Ring-grating | 1483-1493 | 0.05 nm @ 1500 nm | 30,000 | 0.00672 | 2 mm × 1 mm |
| Tapered fiber multimode interference spectrometer | 500-1600 | 10 pm @ 1550 nm | 155,000 | 1.05 | 1.5 mm × π × 40 µm² |

In operation, an input signal 1 propagates through the multimode optical fiber 110 in one or more spatial modes, each of which is characterized by a phase propagation constant $\beta_{l,m}(z)$. Because the multimode optical fiber 110 exhibits modal dispersion, the spatial modes propagate through the fiber at different speeds. Once the spatial modes reach the dispersive region 112, they accelerate at different rates because the dispersive region's modal dispersion varies as a function of position. The dispersive region's taper also frustrates the total internal reflection, causing energy in the spatial modes to leak out of the dispersive region 112. The sensor array 120 detects an interference pattern formed by this leakage 110. And the processor 122 uses calibration data stored in the memory 124 to estimate the spectrum of the input signal 1 from the detected leakage 110.

In the multimode optical fiber 110, the electric field varies in the propagation direction (z) as $$E(z, t) = \exp(i\omega t) \sum_{l,m} E_{0,l,m} \exp(i\beta_{l,m}(z)z)$$

where $\beta_{l,m}(z)$ are the phase propagation constants of the fiber Bessel modes. The tapering of the fiber 110 in the dispersive region 112 additionally modifies this interference along the taper length, as reflected in the z-dependent propagation constant $\beta_{l,m}(z)$, while also introducing a controllable mode leakage that can be measured on a camera.

Figure 1B:
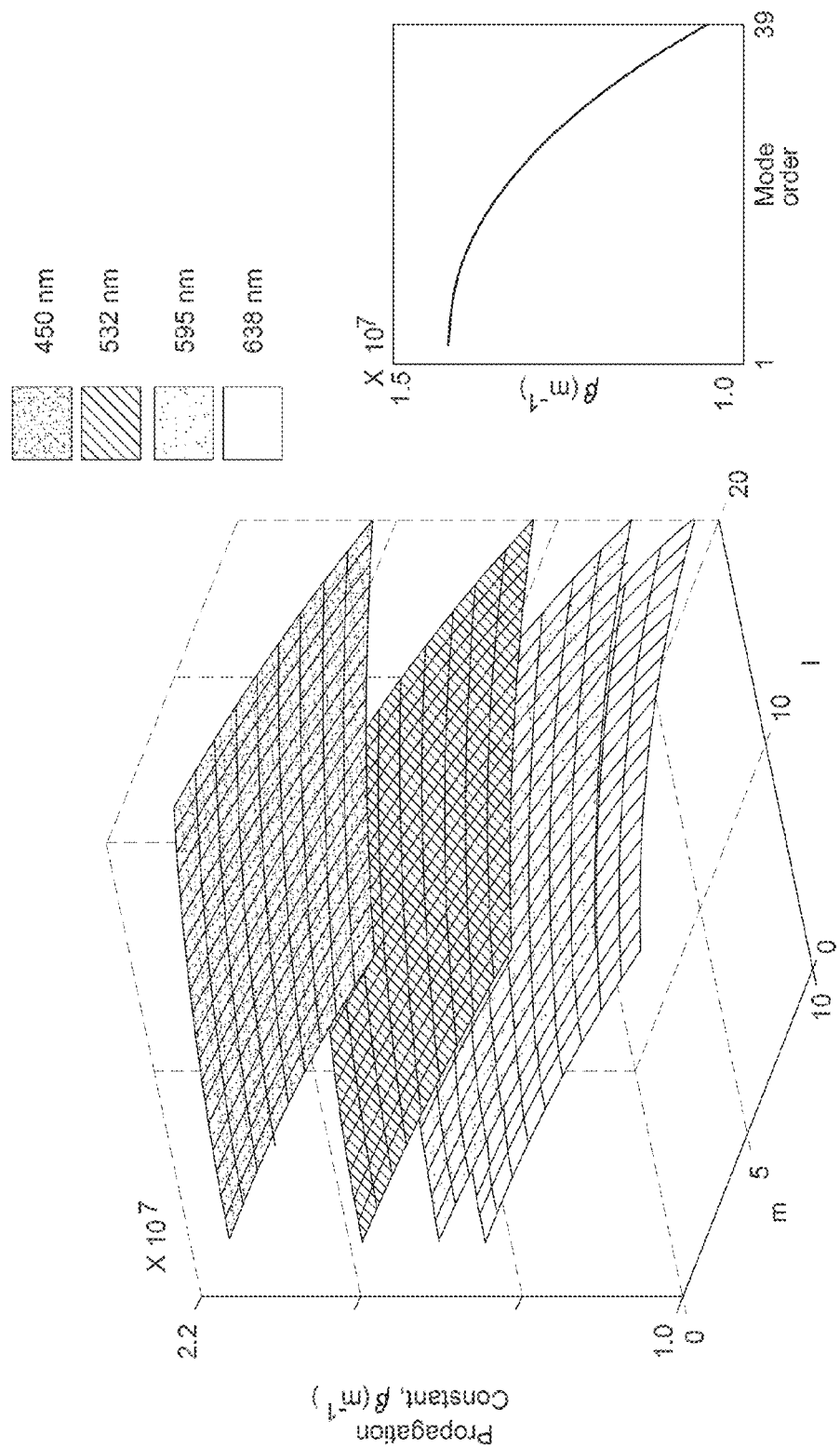
FIG. 1B shows isoplanes of propagation constants in a tapered multimode fiber at frequencies corresponding to wavelengths $\lambda$=450 nm, 532 nm, 595 nm and 638 nm (the inset is a plot of propagation constant versus mode order and shows that the propagation constant decreases more quickly for higher-order modes).

FIG. 1B is a surface plot of phase propagation constants $\beta_{l,m}(z)$ associated with the fiber Bessel modes at wavelengths of 450 nm (top surface), 532 nm (upper middle surface), 595 nm (lower middle surface), and 638 nm (bottom surface) as a function of mode indices l and m. The phase propagation constants are given by:

$$\beta_{l,m} = n_1 k_0 \sqrt{1 - 2(l+2m)^2 \Delta/M},$$

where $k_0$ is the free-space wavenumber, $\Delta=(n_1-n_2)/n_1$, $M=16D^2NA^2/\pi^2\lambda^2$, D is the diameter of the fiber core, and NA is the numerical aperture. As shown in FIG. 1B, the propagation constants ($\beta$) of all the guided modes (indexed by l and m) of the waveguide fall off between $1.0\times10^7$ m$^{-1}$ and $1.5\times10^7$ m$^{-1}$.

Figure 1C:
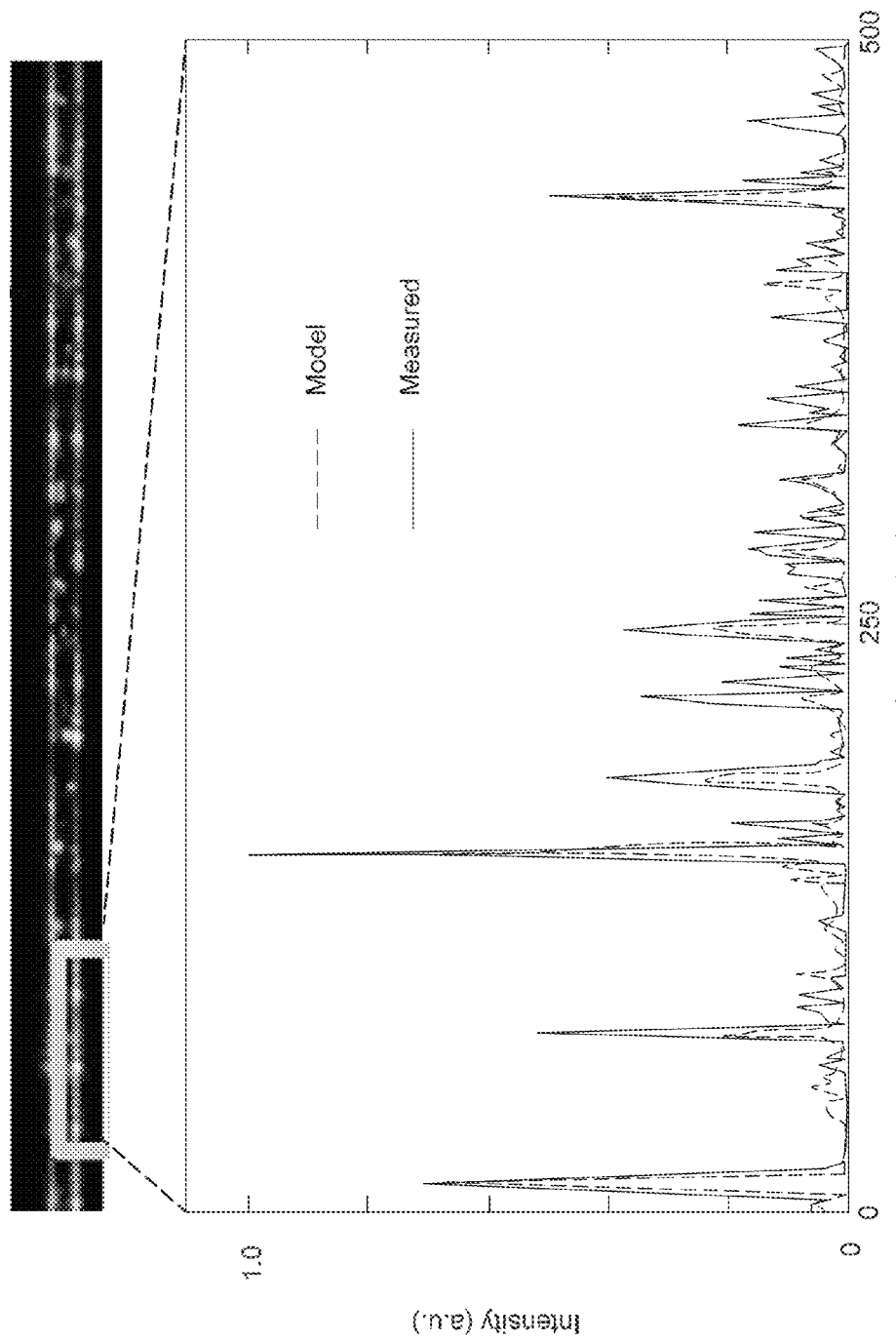
FIG. 1C is an optical image (top) and intensity plot (bottom) of laser light at a wavelength of 638 nm measured using a TFMMI spectrometer.

FIG. 1C includes an optical image (top) and an intensity plot (bottom) of the dispersive region of an exemplary TFMMI spectrometer illuminated with laser light at a wavelength of 638 nm. The optical image shows the multimode interference pattern $I=|E(x,y,z)|^2$ formed by leakage from the spatial modes guided by the fiber. The beatings in the interference pattern can be estimated by $\Delta z = 2\pi/\Delta\beta$, which should be larger than the sensor array's pixel pitch to resolve the interference, as shown in the intensity plot. The data shown in the intensity plot can be acquired with a simple camera and provides enough information to achieve a spectral resolution of 0.01 nm at 1550 nm (Q=155,000), an operating range of 500 nm to 1600 nm, a bandwidth B=1.05, and a monolithic, millimeter-scale footprint.

The intensity plot also shows a model of the TFMMI output at a wavelength of 638 nm. For simplicity, the model treats the spacing between propagation constants as a linear increment and the fiber as a straight waveguide. This is justified because the exemplary TFMMI spectrometer used to make the measurements shown in FIG. 1C includes a fiber whose diameter tapers from 30 μm to 15 μm, over a length of 500 μm, giving a fractional change of $\delta\beta_{l,m}/\beta_{l,m} \ll 1$. As the experimental multimode interference pattern results from coupling light from the signal fiber to the device, the excited modes are have unpredicted and variable amplitudes; after an optimization routine, the total intensity distribution of the dominant modes $I(z)=|E(z)|^2$ is in good agreement with the detected signal. Without being bound by any particular theory, it appears that the deviation between the model and the experimental data mainly results from simplifications in the model, scatterers on the fiber, surface roughness, and defects resulting from fabrication imperfections.

Figure 1D:
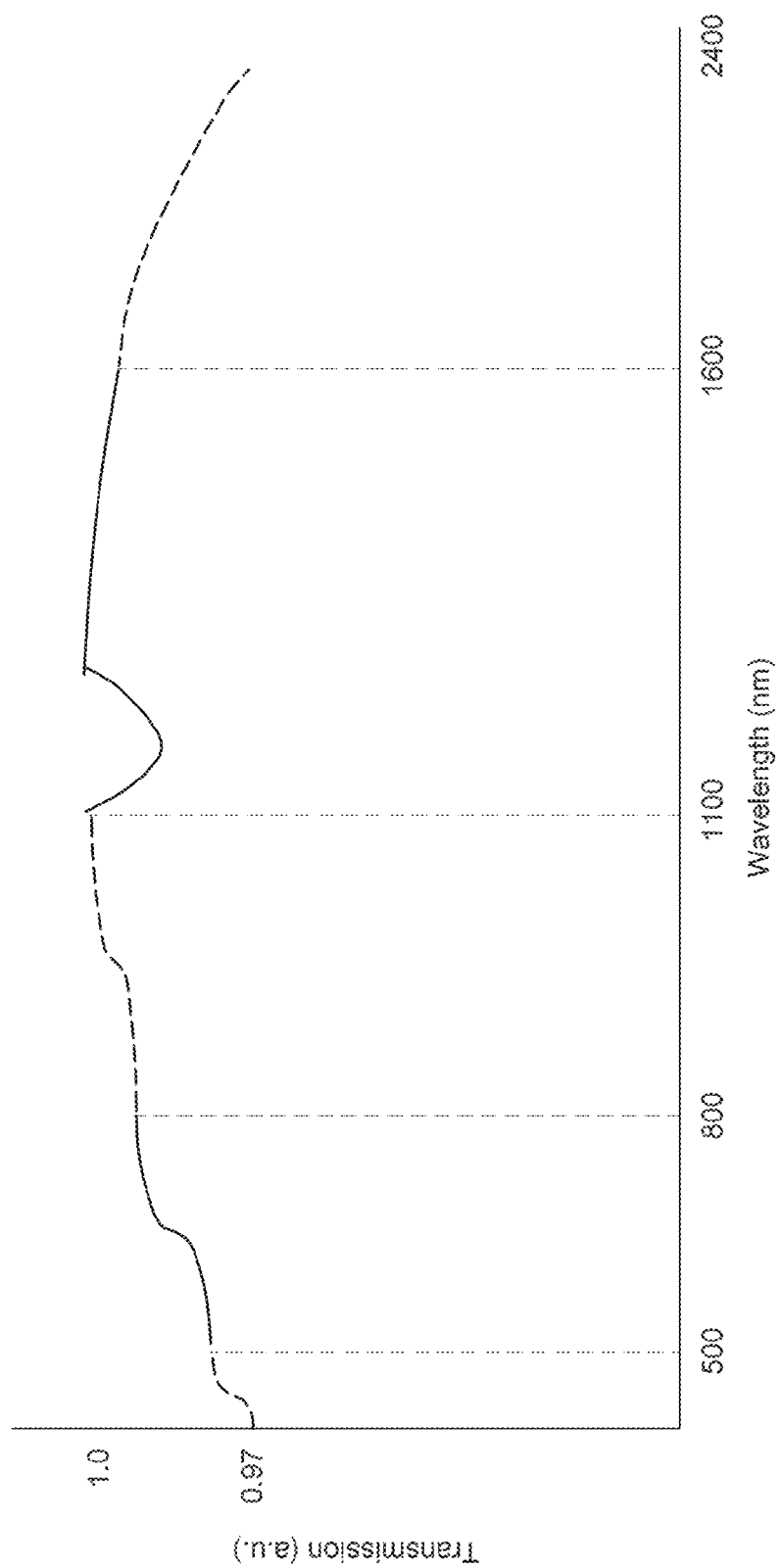
FIG. 1D is an illustration of the transmission spectrum of multimode fiber suitable for use in a TFMMI spectrometer (other TFMMI spectrometers may have broader spectral ranges and/or spectral ranges spanning different wavelengths).

FIG. 1D is a plot of the transmission spectrum of multimode fiber suitable for use in a TFMMI spectrometer. Using this particular fiber, for example, the spectrometer can have an operation range from 400 nm to 2400 nm, of which sections in solid lines have been verified experimentally.

Nanoparticle-Based Multimode Interference Spectrometer

Figure 2A:
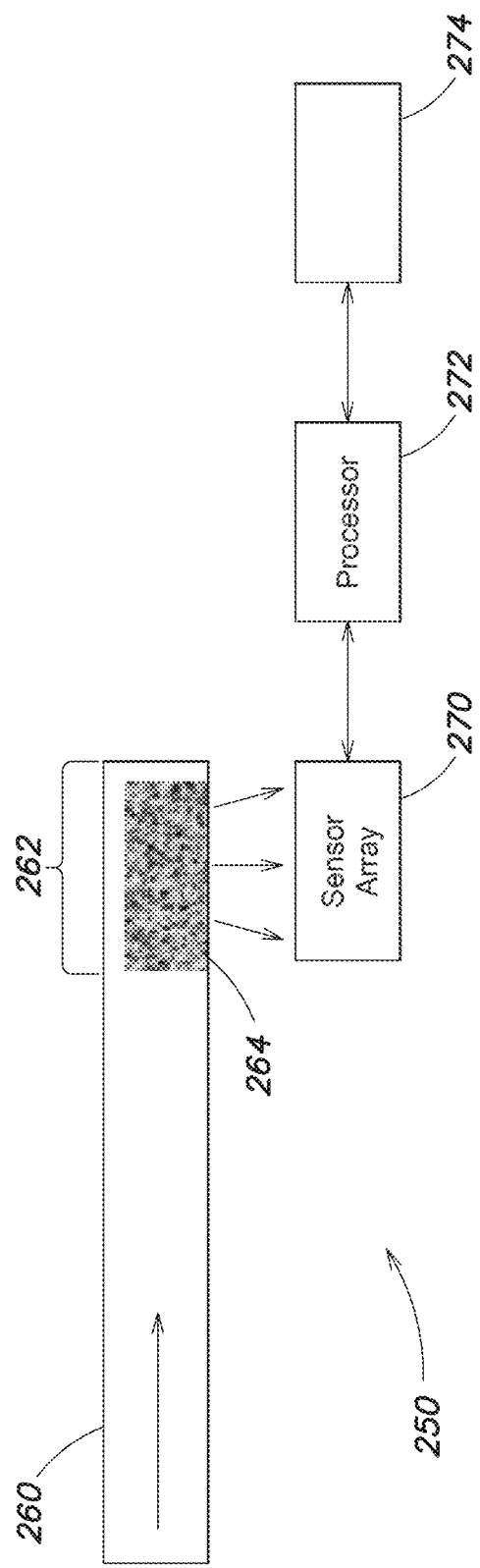
FIG. 2A illustrates a multimode interference spectrometer based on a nanoparticle-doped waveguide.

FIG. 2A illustrates a nanoparticle-based multimode interference spectrometer 250 capable of operating over wide spectral ranges with fine spectral resolution. Like the spectrometer 100 shown in FIG. 1A, the nanoparticle-based multimode interference spectrometer 250 includes a multimode waveguide 260, such as an optical fiber or silicon-on-insulator waveguide, that guides two or more spatial modes. The multimode waveguide 260 defines a dispersive region 262 with an intermodal dispersion that varies as a function of position along the waveguide's optical (longitudinal) axis. More specifically, the dispersive region 262 includes a plurality of nanoparticles 264 distributed throughout the waveguide to scatter the incident spatial modes. The nanoparticles 264 may distributed randomly or in a particular pattern (e.g., in a periodic or sparse array) with uniform or varying sizes. In general, the nanoparticles 264 should remain fixed between calibrations and during measurements to ensure that the measurements are accurate.

In operation, energy in the spatial modes couples out of the dispersive region 262 towards a sensor array 270. The sensor array 270 detects an interference pattern formed by the spatial modes. A processor 272 operably coupled to the sensor array 270 uses calibration data to map the detected interference pattern to a representation of the spectrum of the light coupled into the multimode waveguide 260. The spectrometer's operating range may span the transparency window of the multimode waveguide 260 (e.g., about 400 nm to about 2400 nm for silica-based waveguides). And the spectrometer's spectral resolution may be on the order of about 10 pm, depending on the degree of intermodal dispersion in the dispersive region 262.

Integrated Multimode Interference Spectrometer

Figure 2B:
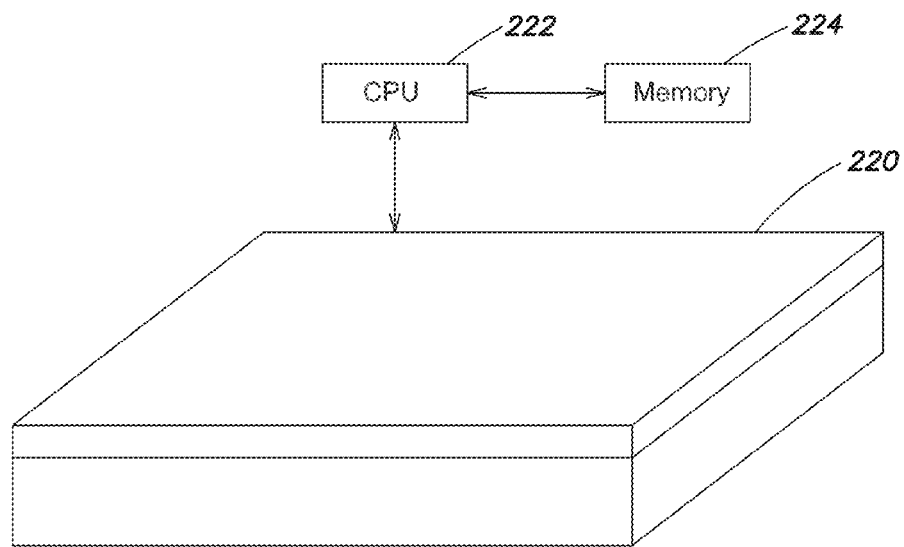
FIG. 2B illustrates a multimode interference spectrometer based on a spiral-shaped, planar waveguide fabricated on a substrate.
Figure 2B:
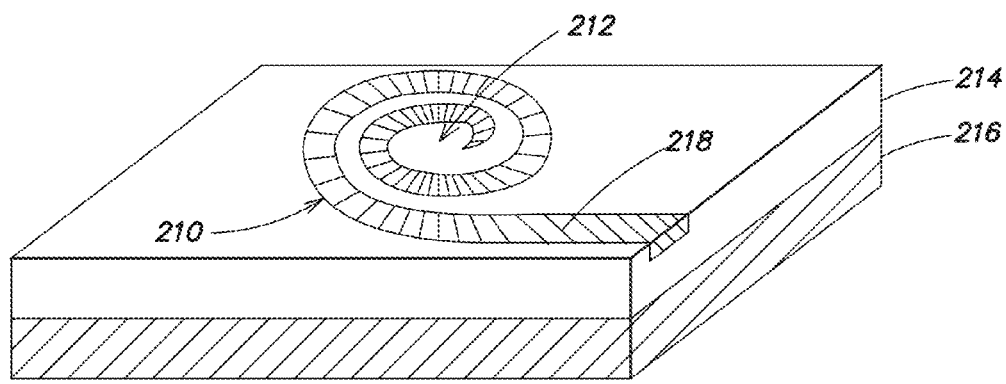

FIG. 2B illustrates an integrated multimode interference spectrometer 200 that includes a multimode waveguide 210 comprising a higher-index material 218, such as silicon or photoresist (e.g., S1813), deposited on a lower-index material 214, such as silicon dioxide or fluoropolymer (e.g., CYTOP). The lower-index material 214 can in turn be deposited on a substrate 216, such as a silicon wafer, as understood by those of skill in the art. For instance, the multimode waveguide 210 may be formed using lithography, printing, etching, or self-assembly. If desired, the multimode waveguide 210 may also be covered with a layer of protective material (not shown) that is transparent over the spectrometer operating range.

The multimode waveguide 210 defines a dispersive region 212 whose intermodal dispersion varies as a function of propagation distance. In this case, the dispersive region 212 is a spiral-shaped taper that is compact enough to fit in a relatively small area (e.g., hundreds of square microns to a few square millimeters); in other cases, it may be straight, curved, or serpentine in shape. The dispersive region's bend radius may be smaller than the loss-free bend radius to promote leakage of energy in the spatial modes out of the waveguide.

The spectrometer also includes a sensor array 220, such as an inexpensive two-dimensional imaging array like those used in smartphones and digital cameras, disposed above the dispersive region 212. In operation, the sensor array 220 detects an interference pattern formed by interference of different spatial modes coupled out of the dispersive region 212. A processor 222 coupled to the sensor array 220 maps the detected interference pattern to an estimate of the spectrum of the spectrometer input using calibration data stored in a memory 224 as described above and below.

Figure 2C:
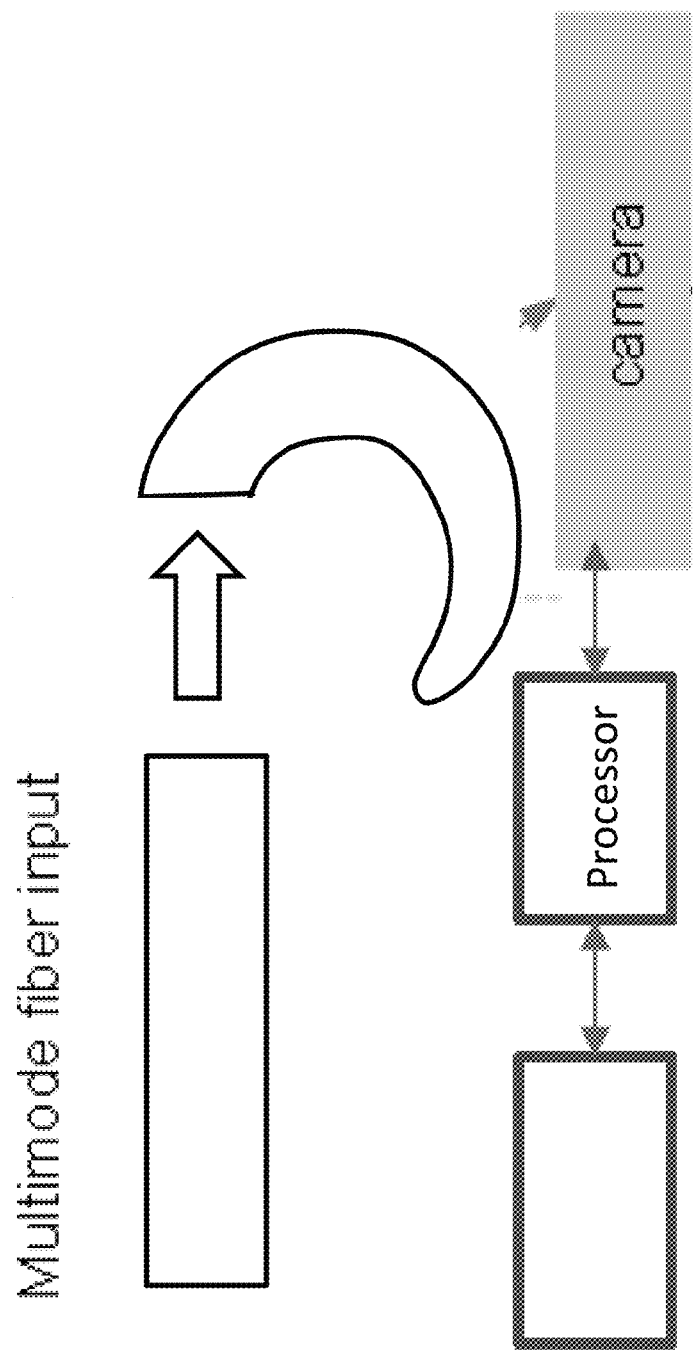
FIG. 2C illustrates a multimode interference spectrometer based on a tapered, spiral-shaped multimode optical fiber.

FIG. 2C illustrates a multimode interference spectrometer based on a tapered, spiral-shaped multimode optical fiber.

Spectra from Multimode Interference Patterns

Given any arbitrary measured response signal $\vec{\Psi} \in \text{span}\{\vec{\lambda}_i\}_{i=1}^N$, the amplitude vector constituting the signal's spectrum, $\vec{s} = (s_1, s_2, \ldots, s_N)$, can recovered by left-inversion using the Moore-Penrose pseudo-inverse matrix, $\Lambda^+$, given by the singular decomposition of $\Lambda$ to obtain the least-squares solution $\vec{s} = \Lambda^+ \vec{\Psi}$. This approach is valid as the solution obtained by applying the $\Lambda^+$ on the measured $\vec{\Psi}$ minimizes the 2-norm $\|\Lambda \vec{s} - \vec{\Psi}\|_2$. This least-square solution is the physical solution to the over-determined system $\Lambda \vec{s} = \vec{\Psi}$, and also indicates that this method works even for $\vec{\Psi} \notin \text{span}\{\vec{\lambda}_i\}_{i=1}^N$ that is within the operation range of the spectrometer, which one would encounter in practical applications because of the continuity of spectra. Factoring noise into the singular value decomposition (SVD) of $\Lambda = U\Sigma V^\dagger$ and because U and V are unitary, $\|\Sigma + \delta\Sigma\|_2 = \|U^+(\Lambda + \delta\Lambda)\|_2 = \|\Lambda + \delta\Lambda\|_2$ which means that experimental perturbations when obtaining $\Lambda$ translate to perturbations of similar orders in its singular values. These small perturbations in turn result in large changes in the singular values of the pseudo-inverse matrix, because $\Sigma^- = \text{diag}(\delta_1^{-1}, \delta_2^{-1}, \ldots, \delta_N^{-1})$. Thus, experimental noise of the device and environment can affect spectral retrieval.

Experimental calibration and characterization can be used to identify and compensate for noise. In one example, noise was identified by obtaining 30 images of a TFMMI spectrometer's dispersive region at a fixed wavelength and power and calculating the correlation between each pair of images. The noise level was defined as the maximum change in correlation. At visible (at 638 nm) and infrared (at 1550 nm) wavelengths, the noise levels were 0.834% and 0.288%, respectively. To address this noise, a truncated SVD of $\Lambda$ was used to obtain a solution $\vec{s}_0$, which is then used as an initial guess to the minimization problem $\|\Lambda \vec{s} - \vec{\Psi}\|_2$, which is solved using a nonlinear optimization algorithm.

Multimode Interference Spectrometer Characterization and Measurements

FIG. 3-6 illustrate multimode interference spectrometer data obtained from a tapered fiber imaged with a microscope. Considering a linear response of the cameras and after removal of dark counts (DC), the detection efficiencies were calculated as:

$$\frac{\text{signal} - \text{DC}}{\text{input} - \text{DC}} \frac{3.43}{85.4} \left( \text{or } \frac{\text{signal} - \text{DC}}{\text{input} - \text{DC}} \frac{14.2}{1654} \right),$$

where the detection efficiency is defined as the ratio of intensity incident on the detector array to the total intensity launched into the fiber. The overall experimental detection efficiency was about 0.01% in the visible and 0.32% in the infrared spectrum. For the detection efficiency measurements, a flat-cleaved fiber core was employed as an input reference. To avoid saturating the visible and infrared detector arrays, the input reference power was chosen to be 3.43 µW (14.2 µW) at 638 nm (1550 nm), and the microscope imaged light from the fiber core onto the detector array. The input counts were obtained by summing over all intensities. For the TFMMI spectrum measurements, the power was increased to 85.4 µW (1654 µW) and also took an image with the same exposure time for the region of interested.

As the TFMMI spectrometer relies on dispersion and interference of multiple transmitting modes, its polarization dependence should also be considered. A polarization controller at the device input repeatedly changed the polarization states during image acquisition. The maximum polarization changes in the visible and infrared ranges were 21.30% and 7.00%, respectively. As the device had a total length of several centimeters including its untapered input section, the stability of the spectrometer can be further improved using polarization-maintaining fibers to guide light into the tapered waveguide.

Figure 3A:
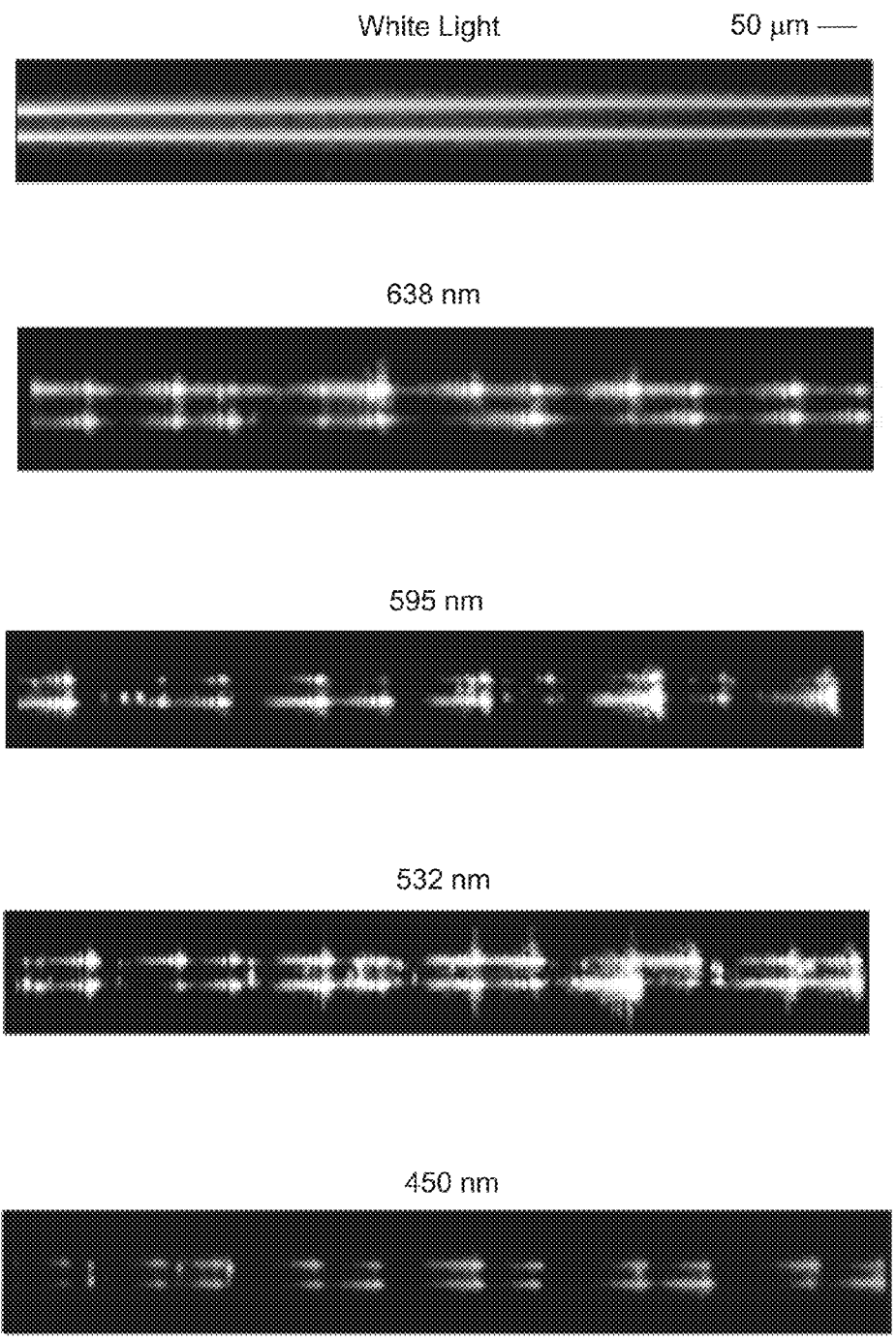
FIG. 3A includes images of white light (top) and light at wavelengths of 638 nm (upper middle), 595 nm (middle), 532 nm (lower middle), and 450 nm (bottom) propagating through a tapered optical fiber under 630× magnification.
Figure 3B:
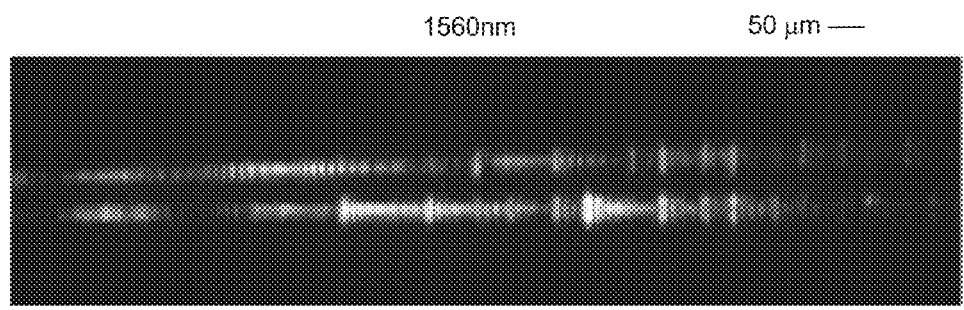
FIG. 3B shows monochrome CCD images showing the spatial distribution of intensities of wavelengths through the fiber of FIG. 3A at wavelengths of 1560 nm (top), 1561 nm (middle), and 1562 nm (bottom).
Figure 3B:
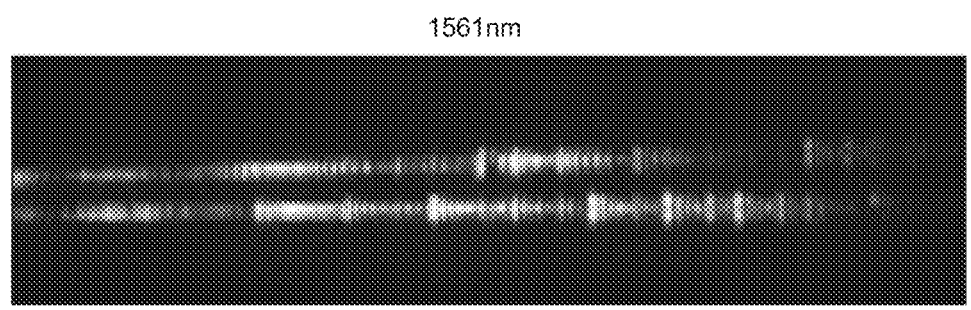
Figure 3B:
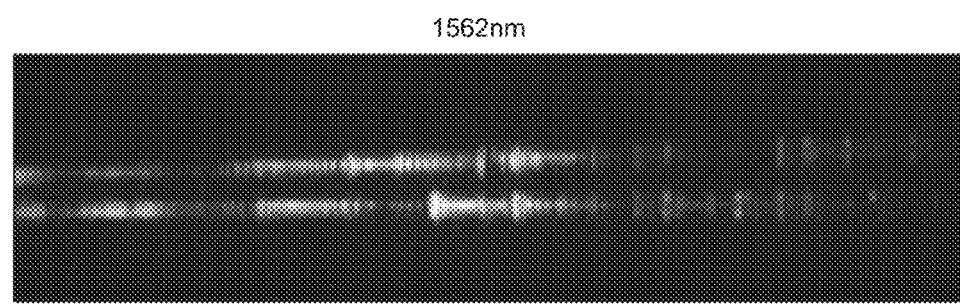

FIGS. 3A and 3B show the interference patterns obtained using the TFMMI spectrometer 100 of FIG. 1A for input wavelengths of 450 nm, 532 nm, 595 nm and 638 nm in the visible spectrum and 1560 nm, 1561 nm and 1562 nm in near-infrared, respectively. Different laser frequencies correspond to clearly resolvable multimode interference images. Coupling the multimode fiber input of the TFMMI spectrometer to a single-mode fiber via a standard fiber-optic connector yields a negligibly low insertion loss. Detection with a CCD camera through an objective with a numerical aperture (NA) of about 0.9 enables 28.2% of the input photon flux to be detected on the camera.

FIGS. 4A-4E are plots illustrating characterization of a TFMMI spectrometer using narrowband laser fields (e.g., laser fields with linewidths of less than about 10 MHz) tuned from 634.800 nm to 639.400 nm in steps of 2 pm and from 1500.000 nm to 1580.000 nm in steps of 1 µm. The resulting images, which have pixel counts of X×Y, are concatenated to produce vectors $\vec{\lambda}$ of length L=X×Y. The vectors $\vec{\lambda}$ resulting from the intensity distributions are normalized and stored in an L×N 'calibration matrix' $\Lambda$, where N is the number of scanned wavelengths. As a single-mode fiber was used to couple light into the device, the wavelength-associated fingerprints that constitute this calibration matrix are independent of the actual input light profile. Splicing the single-mode fiber directly to the tapered multimode fiber ensures a permanent calibration matrix.

Figure 4A:
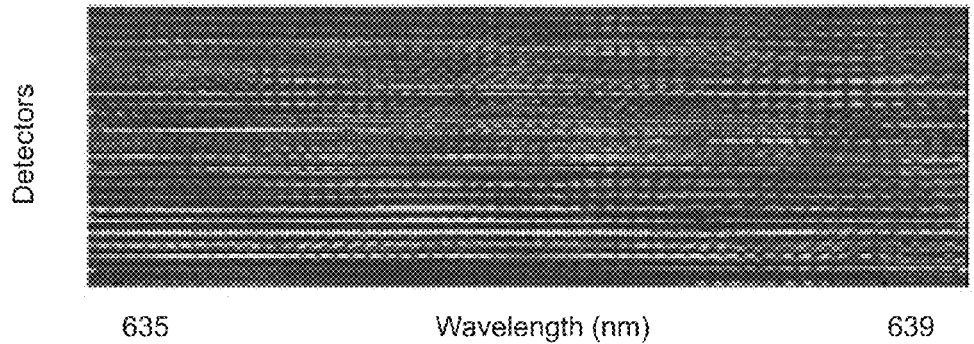
FIGS. 4A and 4B are plots of response matrices that show the spatial dependence and random intensity distributions of different wavelengths through a tapered multimode optical fiber from 634.800 nm to 639.400 nm and from 1500.000 nm to 1580.000 nm, respectively.
Figure 4B:
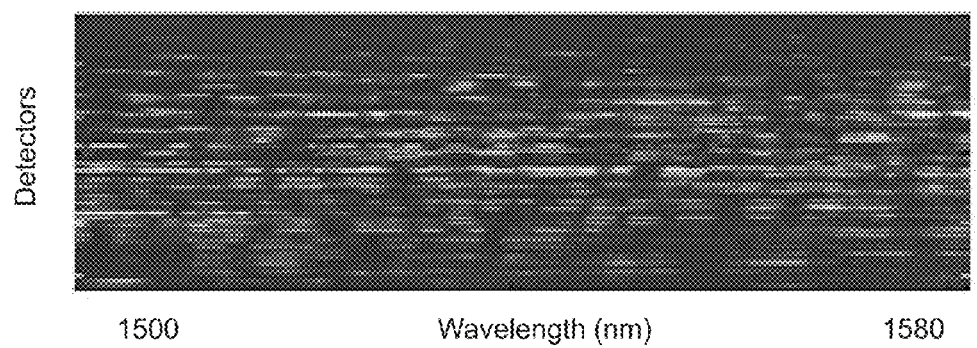
Figure 4C:
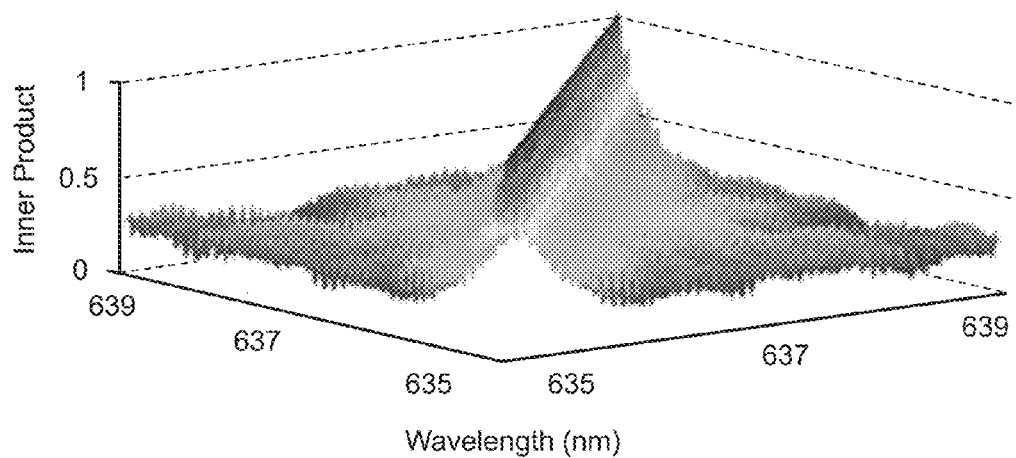
FIGS. 4C and 4D are surface plots of the monotonically decreasing inner products $\vec{\lambda}_i \cdot \vec{\lambda}_j$ showing decreasing overlap of spatial distribution of intensity from 634.800 nm to 639.400 nm and from 1500.000 nm to 1580.000 nm, respectively.
Figure 4D:
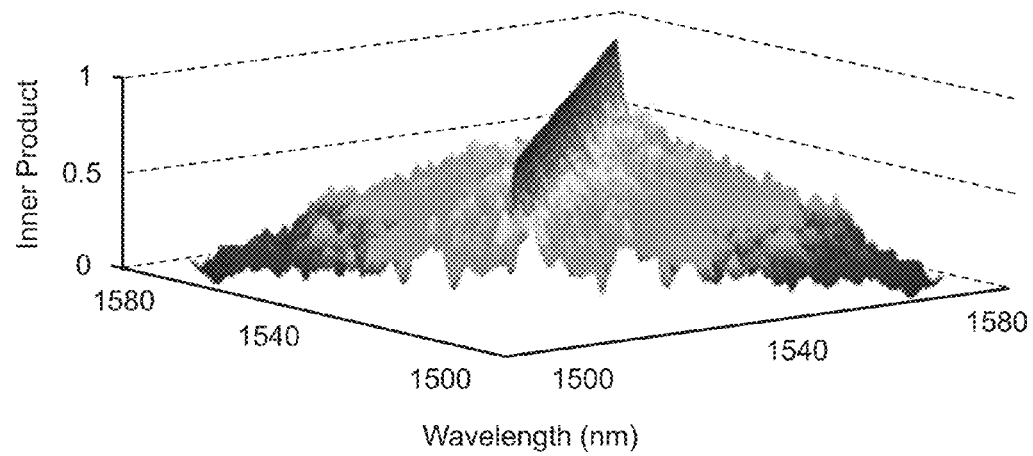

FIGS. 4A and 4B show the normalized intensity distributions (maps) along the fiber for visible and infrared wavelengths, respectively, with wavelength on the x axis and detector coordinate on they axis. FIGS. 4C and 4D are surface plots that show every pairwise permutation of inner products, $\vec{\lambda}_i \cdot \vec{\lambda}_j < 1$ for all i≠j, using the maps in FIGS. 4A and 4B as calibration matrices. For an ideal MMI spectrometer of infinite length, after normalization, $\vec{\lambda}_i \cdot \vec{\lambda}_j \to 0$ with increasing wavelength separation $|\vec{\lambda}_j - \vec{\lambda}_i|$. In practice, however, there are non-trivial overlapping spatial channels between these non-canonical basis states due to the finite length of the multimode waveguide, but as seen from FIGS. 4C and 4D, the inner products $\vec{\lambda}_i \cdot \vec{\lambda}_j$ monotonically decrease to isolation levels of about $10^{-1}$ with wavelength separation, as desired for a well-behaved overcomplete basis set.

The low hydroxyl concentration in silica multimode fiber causes high absorption in the ultraviolet region of the electromagnetic spectrum, but endows the fiber with high transparency in the visible and near-IR regions of the electromagnetic spectrum. As a result, a fiber-based MMI spectrometer can efficiently support a wavelength range from 400 nm up to 2400 nm, e.g., as displayed in FIG. 1D.

Figure 4E:
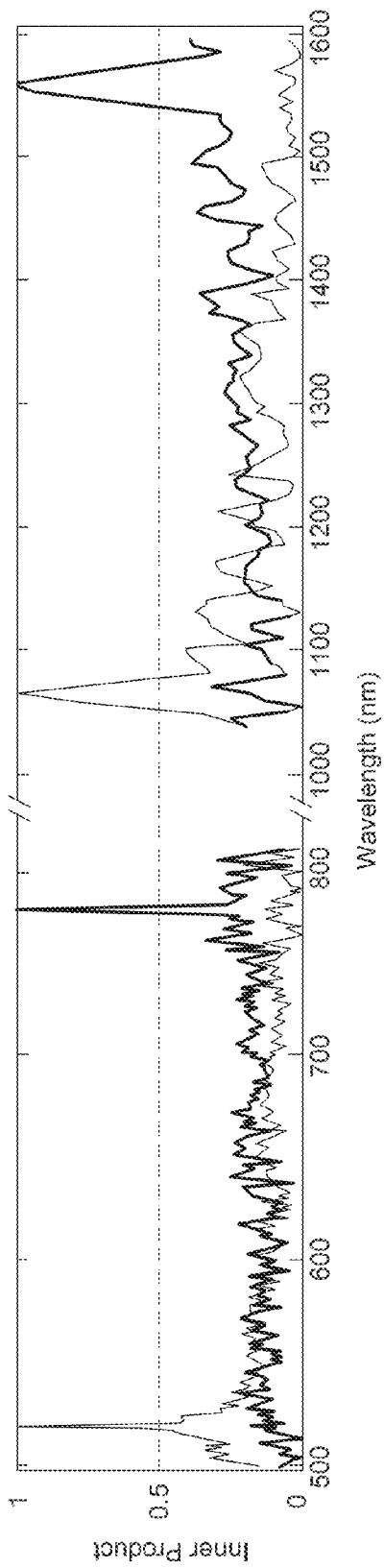
FIG. 4E is a plot of the inner products for a TFMMI spectrometer between wavelengths from 500 nm to 800 nm and from 1040 nm to 1595 nm.

FIG. 4E is a plot of the inner products between wavelengths from 500 nm to 800 nm and from 1040 nm to 1595 nm. It shows that the inner products decay to levels of about $10^{-1}$ and do not achieve unity elsewhere other than the inner product with itself, showing that no two distinguishable wavelengths have the same associated fingerprint. This confirms that a TFMMI spectrometer indicates a nearly orthonormal basis in these broad wavelength ranges—in this case, an operation range of at least 1.1 μm, i.e., from 500 nm to 1595 nm.

Broad-range spectroscopy can be performed for any input field supported by the fiber after calibrating with a full-rank matrix $\Lambda$: Given any arbitrary measured response signal $\vec{\Psi}$, it is possible to recover the amplitude vector constituting the signal's spectrum, $\vec{s}=(s_1, s_2, \ldots, s_N)$, by left-inversion using the Moore-Penrose pseudo-inverse matrix, $\Lambda^+$, to obtain the least-squares solution, $\vec{s}=\Lambda^+\vec{\Psi}$. This least-square solution is desirable because it is applicable for physical situations when $\vec{\Psi} \notin \mathrm{span}\{\vec{\lambda}_i\}_{i=1}^N$, which is relevant in spectroscopy due to the continuity of spectra and presence of experimental noise. Thus, with the least-squares solution, imposing the condition that $s_j>0$ for all j makes it possible to solve the more general nonlinear minimization problem $\|\Lambda\vec{s}-\vec{\Psi}\|_2$.

Figure 5A:
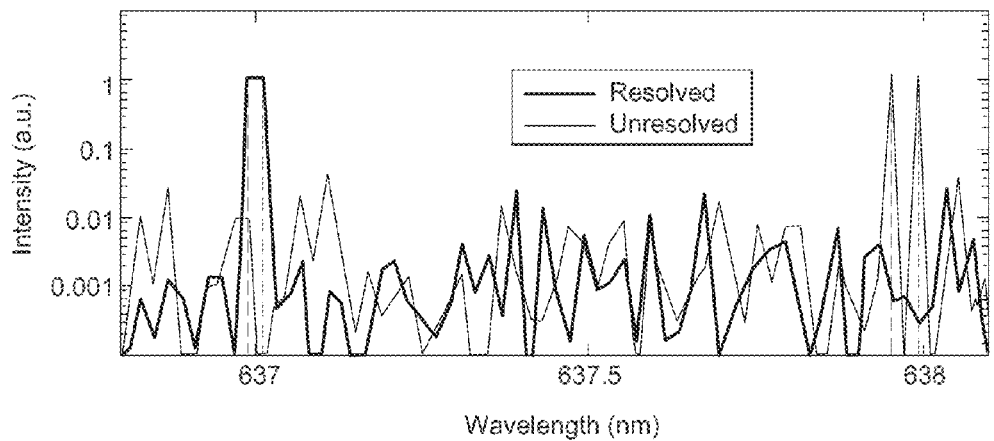
FIGS. 5A-5D are plots of spectra measured using a TFMMI spectrometer.
Figure 5B:
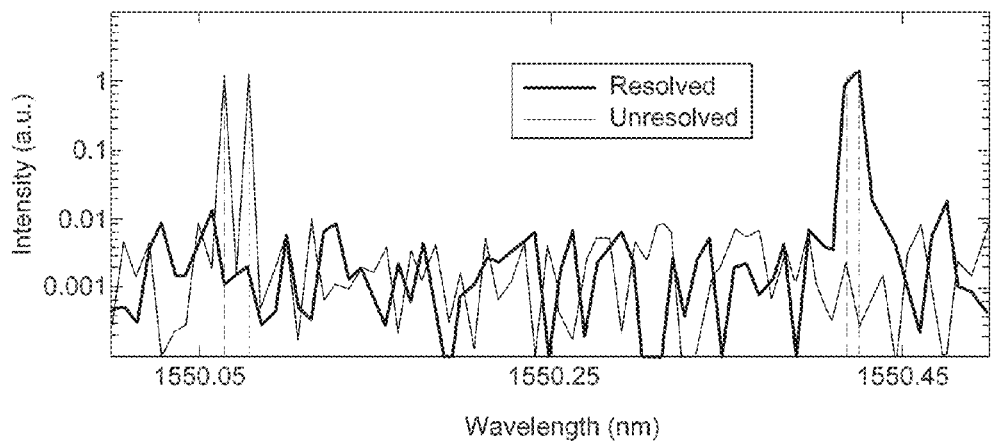

FIGS. 5A and 5B are plots of normalized intensity profiles of pairs of resolved and unresolved input wavelengths in the visible and infrared, respectively. In FIG. 5A, sharply peaked input wavelengths of 637.96 nm and 638.00 nm are clearly resolved while input wavelengths of 637.00 nm and 637.02 nm are not fully resolved, indicating a resolution of the TFMMI of $\Delta\lambda=40$ pm at 638 nm. And in FIG. 5B, sharply peaked input wavelengths of 1550.070 nm and 1550.080 nm are clearly resolved while input wavelengths of 1550.410 nm and 1550.415 nm are not fully resolved, indicating a resolution of $\Delta\lambda=10$ pm at 1550 nm. These plots were produced by acquiring many images sequentially and summing the acquired images to reflect superposition. Over tens-of-milliseconds integration times of these acquisitions, there is no resolvable interference between laser fields for frequency separations of more than 1 pm (0.8 GHz). Therefore, adding sequential measurements at different frequencies is justified (though additional background noise is introduced). The separation between the pair of wavelengths was gradually increased to find the wavelength separation at which the reconstruction algorithm could resolve them. The average and minimum signal-to-noise ratios for each plot exceed 1000 and 10, respectively.

Figure 5C:
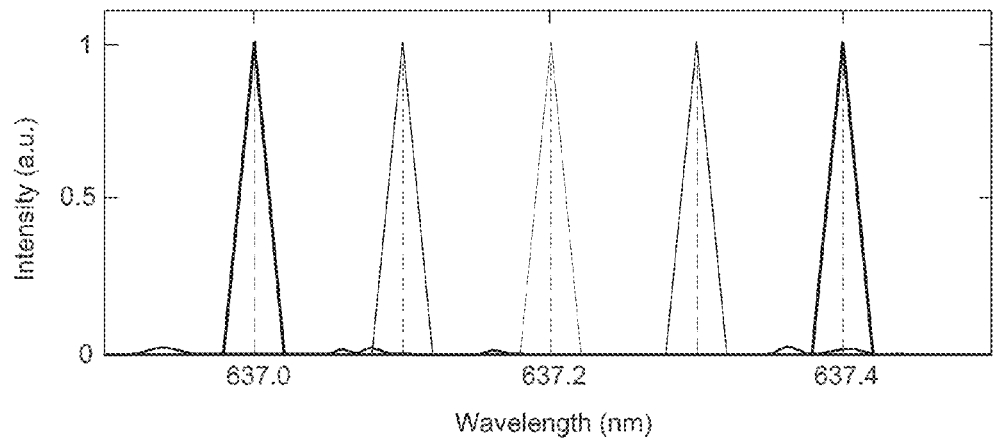
Figure 5D:
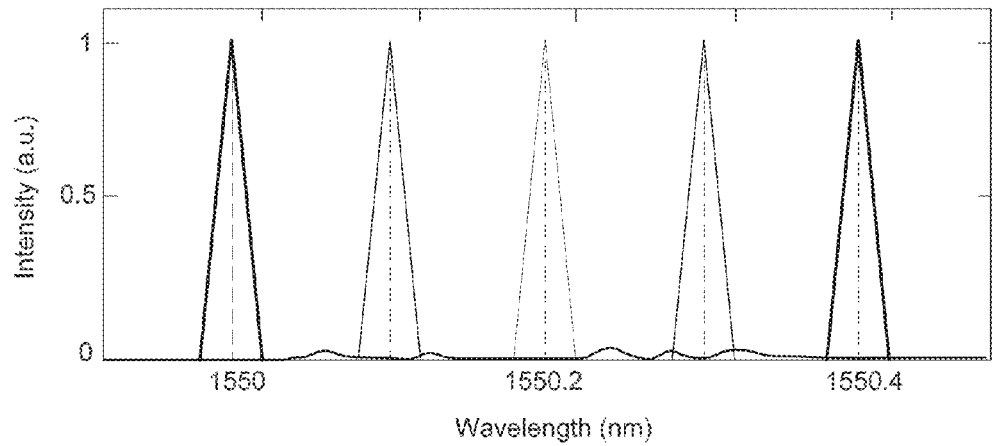

FIGS. 5C and 5D are plots of normalized intensity versus wavelength for multiple narrow spectra in visible and in infrared, respectively, reconstructed from measurements made with a TFMMI spectrometer.

Figure 5E:
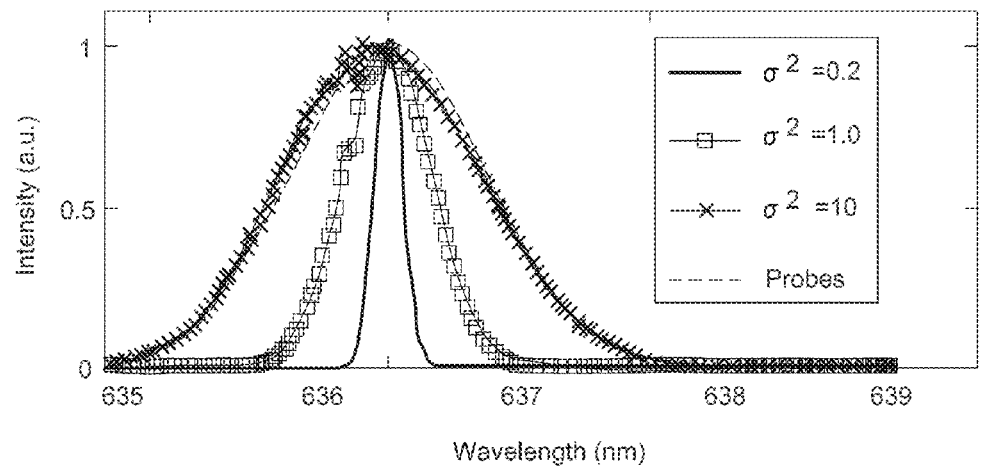
FIG. 5E is a plot of a reconstruction of Gaussian probes with different variances compared to probe spectra measured using a TFMMI spectrometer.

FIG. 5E is plot of three Gaussian-spectrum input probe fields of increasing widths measured using a TFMMI spectrometer. As shown in FIG. 5E, the root-mean-square-deviation of the reconstructed amplitudes from the Gaussian probe with 10 nm variance is 0.0257.

Figure 5F:
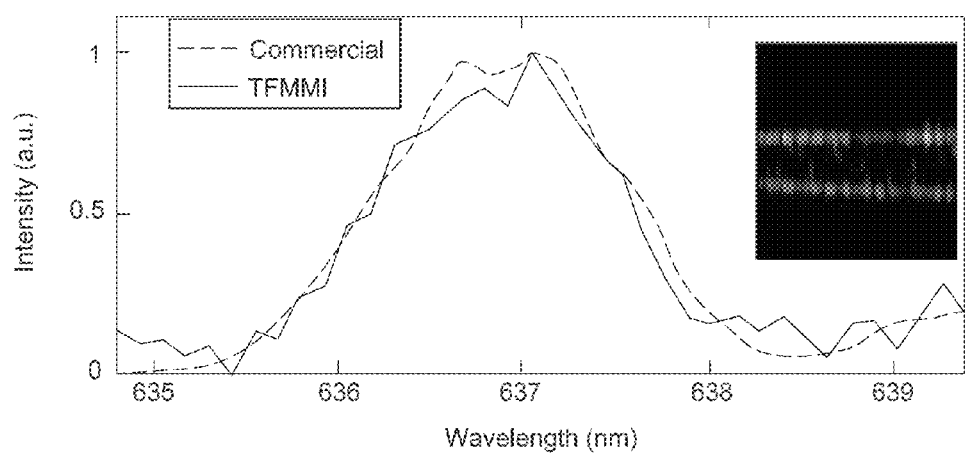
FIG. 5F is a plot showing a reconstructed spectrum obtained using a TFMMI spectrometer (solid line) and a spectrum measured using a conventional spectrometer (dashed line) (the inset shows an image of the tapered fiber in the TFMMI spectrometer).

FIG. 5F is a plot of a non-Gaussian broadband probe signal of about 1.5 nm bandwidth at about 637 nm, generated by measuring filtered light from a supercontinuum light source (SuperK, NKT Photonics), with a TFMMI spectrometer (solid line) and a 75 cm grating spectrometer (Acton 2500; dashed line). The inset shows an image of the dispersive region (tapered fiber) in the TFMMI spectrometer. As shown in FIG. 5F, the match between the TFMMI spectrometer measurement and the grating spectrometer measurement is very close, with both at a resolution of about 0.12 nm.

Figure 6A:
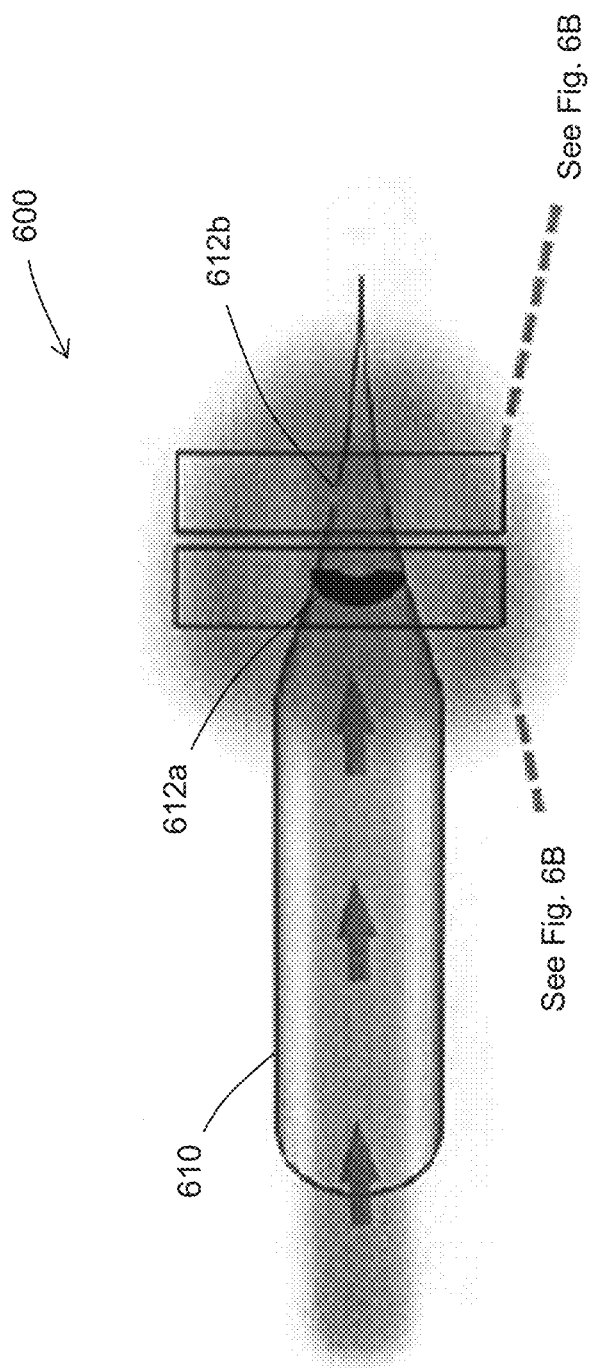
FIG. 6A is a diagram showing a TFMMI spectrometer with multiple sensing regions.
Figure 6B:
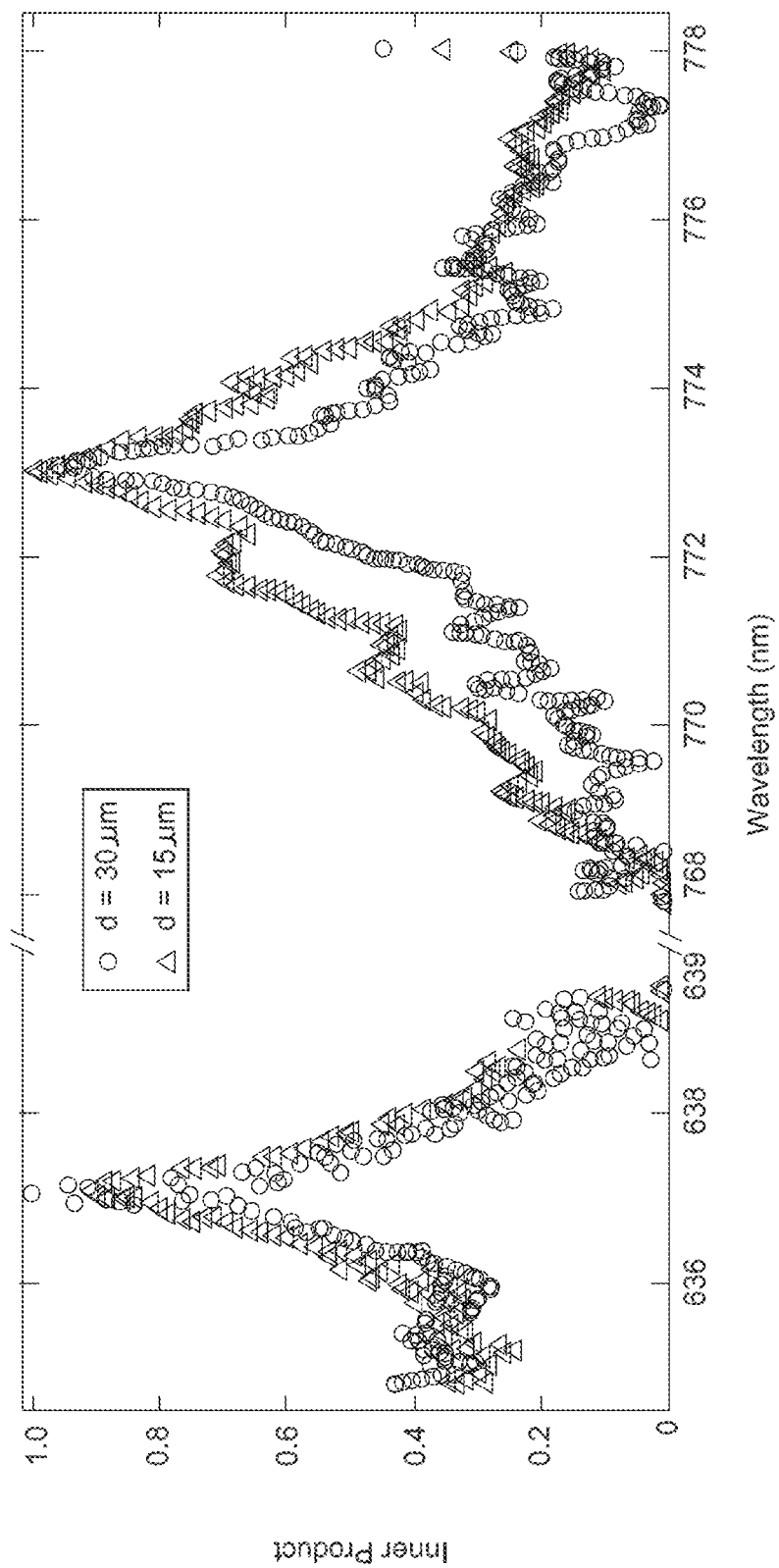
FIG. 6B is plot of inner product versus wavelength at two different regions (fiber core diameters of 15 µm (triangles; upper trace) and 30 µm (circles; lower trace)) of the TFMMI spectrometer.

FIGS. 6A and 6B illustrate the effect of waveguide diameter on spectrometer performance. More specifically, FIG. 6A shows a TFMMI spectrometer 600 with a multimode optical fiber 610 that is tapered exponentially to define two dispersive regions: a first dispersive region 612a with a diameter of about 30 μm and a second dispersive region 612b with a diameter of about 15 μm. One or more sensor arrays (not shown) image the interference patterns produced by light leaking out of the first dispersive region 612a and the second dispersive region 612b. As described above, the detected interference patterns can be used to determine the spectrum of light 1 propagating via multimode optical fiber 610.

FIG. 6B is a plot of the inner products computed from spectral ranges of 636.8-639.4 nm and 768-778 nm from these the first dispersive region 612a (circles) and the second dispersive region 612b (triangles) of the TFMMI spectrometer shown in FIG. 6A. It shows that inner products fall to 0.5 after and ±0.8 nm and ±1.0 nm, respectively, from the central wavelength. Without being bound by any particular theory, current research suggests that the greater number of modes in the thicker section (first dispersive region 612a) yields a multimode interference pattern that is more sensitive to wavelength changes than the thinner section (second dispersive region 612b).

In addition, because the fiber's taper width decreases approximately exponentially with z (the fiber's longitudinal axis), the steeper profile of the thicker dispersive region 612a also means the modal leakage may be more spatially dependent (this can be visualized using geometrical optics) along the fiber 610. This may lead to more characteristics in the intensity distribution for a particular wavelength. Because the device performance scales with length, the taper profile can be suitably engineered to select the taper angle, the taper length, or both to improve the performance (e.g., the spectral resolution and signal-to-noise ratio) and device efficiency, which is 0.01% in the visible and 0.32% in the infrared. In general, the refractive indices and materials can also be selected to further increase the multimode interference contrast, the operational range of the TFMMI spectrometer, and the device efficiency. For applications involving weak sources or complex spectra, increasing the propagation distance and/or increasing the sampling density of the multi-mode interference pattern information could improve the spectral resolution, signal-to-noise ratio, and device efficiency; this can be achieved with circular, spiral, or non-planar waveguide, for instance, and by using finer detector arrays or cylindrical detector arrays, respectively.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the coupling structures and diffractive optical elements disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the coupling structures and diffractive optical elements disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A spectrometer comprising:
an integrated multimode waveguide to guide at least two spatial modes of an electromagnetic beam along a propagation axis, the integrated multimode waveguide comprising a tapered spiral-shaped portion defining a dispersive region having an intermodal dispersion that varies as a function of position along the propagation axis;
a detector array, in optical communication with the dispersive region of the integrated multimode waveguide, to image an interference pattern produced by at least a portion of the at least two spatial modes of the electromagnetic beam; and
a processor, operably coupled to the detector array, to estimate a spectrum of the electromagnetic beam based at least in part on the interference pattern sensed by the detector array.

2. The spectrometer of claim 1, wherein:
the integrated multimode waveguide comprises a layer of dielectric material having a first refractive index disposed on another material having a second refractive index lower than the first refractive index, and
the detector array comprises a plurality of detector elements disposed in a plane substantially parallel to the layer of dielectric material.

3. The spectrometer of claim 1, wherein the processor is configured to estimate the spectrum of the electromagnetic beam by computing a pseudo-inverse matrix $\Lambda^+$ given by a singular decomposition of a matrix $\Lambda$ to obtain a least-squares solution of $\vec{s}=\Lambda^+\vec{\Psi}$, where $\vec{s}$ is an amplitude vector representing the spectrum and $\vec{\Psi}$ is a vector representing the interference pattern.

4. The spectrometer of claim 1, further comprising:
a memory, operably coupled to the processor, to store calibration data representative of a mapping of interference patterns of spatial modes supported by the integrated multimode waveguide to possible spectral components of the electromagnetic beam for use by the processor in determining the spectrum of the electromagnetic beam.

5. A method of sensing a spectrum of an electromagnetic beam using an integrated multimode waveguide defining a propagation direction and having a dispersive region with an intermodal dispersion that varies as a function of position along the propagation direction, the method comprising:
(A) guiding at least two spatial modes of an electromagnetic beam along the propagation direction of the integrated multimode waveguide to the dispersive region, the dispersive region having a tapered spiral-shaped portion;
(B) coupling at least a portion of the at least two spatial modes of the electromagnetic beam out of the integrated multimode waveguide via the dispersive region;
(C) sensing, with a detector array, an interference pattern produced by the at least a portion of the at least two spatial modes of the electromagnetic beam; and
(D) estimating a spectrum of the electromagnetic beam based at least in part on the interference pattern sensed by the detector array.

6. The method of claim 5, wherein:
(A) comprises guiding the at least two spatial modes via a layer of dielectric material having a first refractive index disposed on another material having a second refractive index lower than the first refractive index, and
(C) comprises sensing the interference pattern with a plurality of detector elements disposed in a plane substantially parallel to the layer of dielectric material.

7. The method of claim 5, wherein (D) comprises estimating the spectrum based at least in part upon calibration data representative of a mapping of interference patterns radiated by the dispersive region of the integrated multimode waveguide to possible spectral components of the electromagnetic beam.

8. The method of claim 5, wherein (D) comprises computing a pseudo-inverse matrix $\Lambda^+$ given by a singular decomposition of a matrix $\Lambda$ to obtain a least-squares solution of $\vec{s} = \Lambda^+ \vec{\Psi}$, where $\vec{s}$ is an amplitude vector representing the spectrum and $\vec{\Psi}$ is a vector representing the interference pattern.

* * * * *

UNITED STATES PATENT AND TRADEMARK OFFICE
CERTIFICATE OF CORRECTION

PATENT NO.       : 9,709,440 B2
APPLICATION NO. : 14/325502
DATED            : July 18, 2017
INVENTOR(S)      : Englund et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 208 days.

Signed and Sealed this
Twenty-fifth Day of September, 2018

Andrei Iancu
*Director of the United States Patent and Trademark Office*